United States Patent

[11] 3,539,205

[72] Inventors James Burl Johnson, Jr.;
Horace Bishop Lindly; William Jackson
Ogle, Lubbock, Texas
[21] Appl. No. 766,067
[22] Filed Oct. 9, 1968
[45] Patented Nov. 10, 1970
[73] Assignee Gifford-Hill-Western, Inc.
Lubbock, Texas
a corporation

[54] IRRIGATION PIPE SYSTEM AND PIPE UNITS THEREFOR
4 Claims, 12 Drawing Figs.
[52] U.S. Cl. ................................................ 285/5,
285/260, 285/374, 285/423; 138/118
[51] Int. Cl. ....................................................... F16l 55/00,
F16l 31/00
[50] Field of Search.......................................... 285/104,
105, 108, 260, 304, 305, 321, 369, 374, 423, 5,
343, 345, 113; 138/118

[56] References Cited
UNITED STATES PATENTS
2,735,505 2/1956 Kleiman ........................ 285/374X
3,149,861 9/1964 Larsson ......................... 285/382.2X
3,425,452 2/1969 Shaw ............................. 285/343X FOREIGN PATENTS
223,952 3/1958 Australia ...................... 285/374
340,937 7/1904 France .......................... 285/343
17,104 5/1882 Germany...................... 285/345
932,706 9/1955 Germany...................... 285/345
1,221,505 7/1966 Germany...................... 285/369

Primary Examiner—Dave W. Arola

ABSTRACT: Water distribution system formed of one piece plastic units with thickened end portions forming watertight seal that automatically distributes longitudinal stress along members of a series of such pipe elements; water distribution pipe units each comprising integral plastic pipe, bell and spigot portions, integral gasket seat and thickened portions; an apparatus for manufacture of plastic pipe units comprising an axially movable shaped mandrel with an expanding plate movable with smoothly increasing eccentricity, and process of pipe unit manufacture comprising steps of continuously extruding a pipe of varied wall thickness and forming joints through thickened portions.

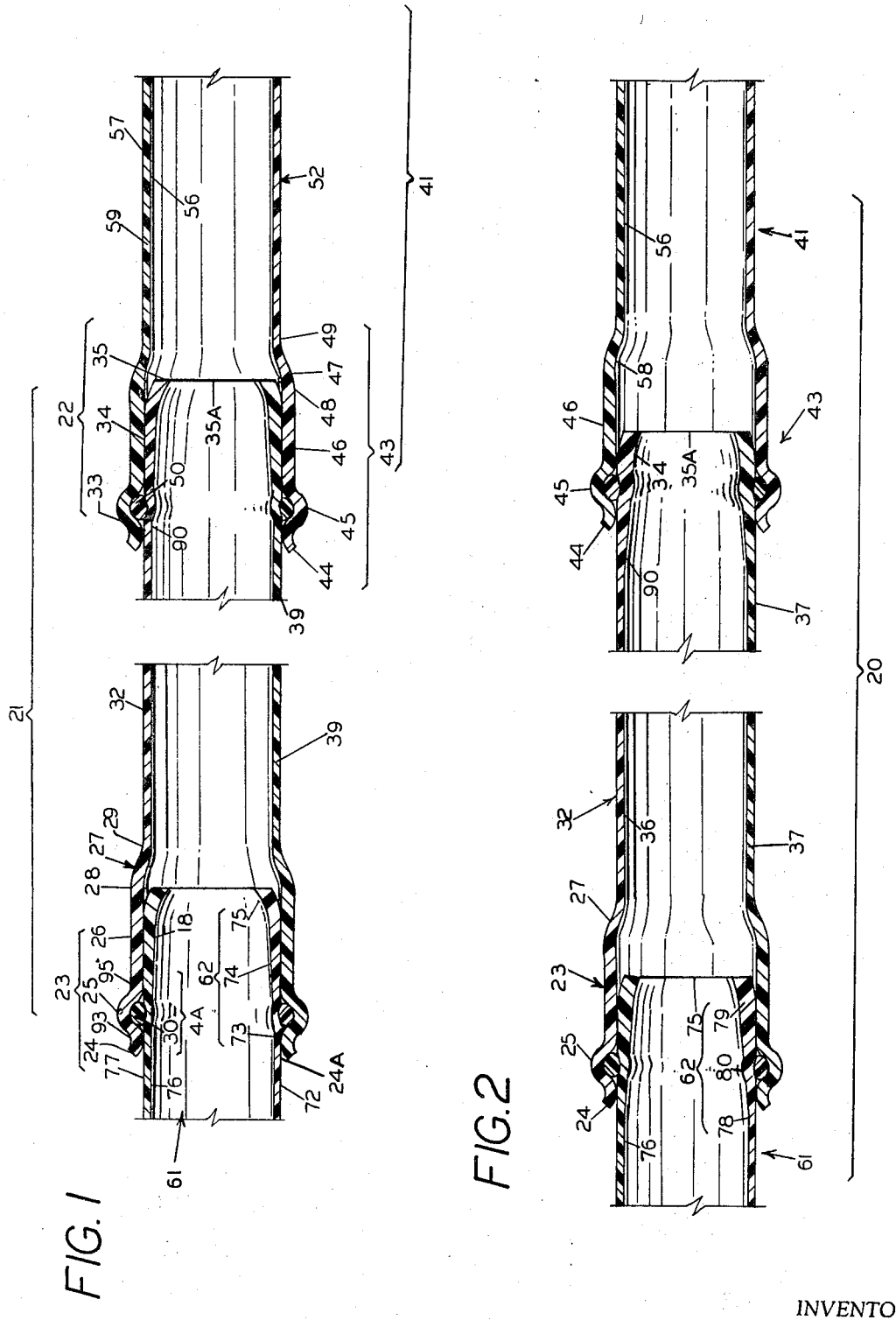

Patented Nov. 10, 1970

INVENTOR.
W. J. OGLE, H. B. LINDLY,
AND J. B. JOHNSON, JR.

BY Ely Silverman
ATTORNEY

Patented Nov. 10, 1970

INVENTOR.
W. J. OGLE
H. B. LINDLY AND
J. B. JOHNSON, JR
BY Ely Silverman
ATTORNEY

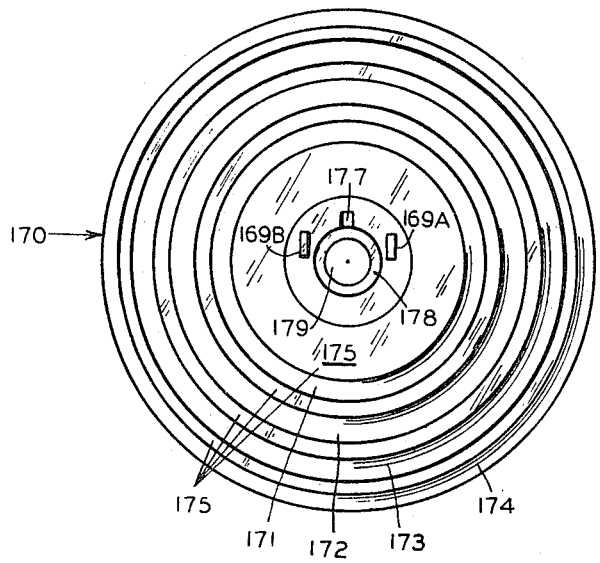
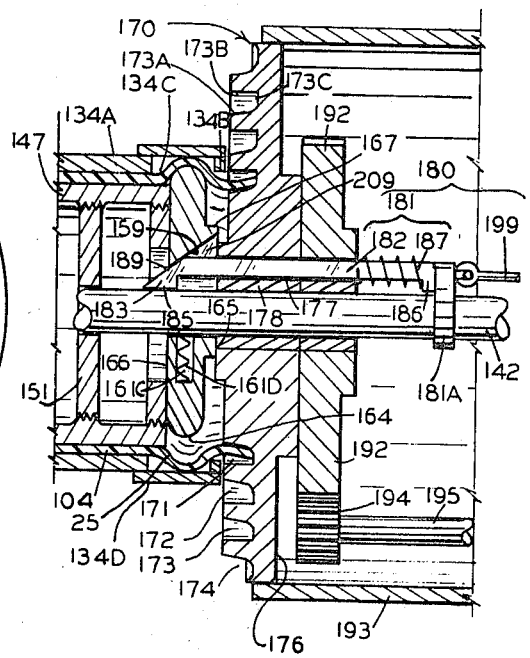
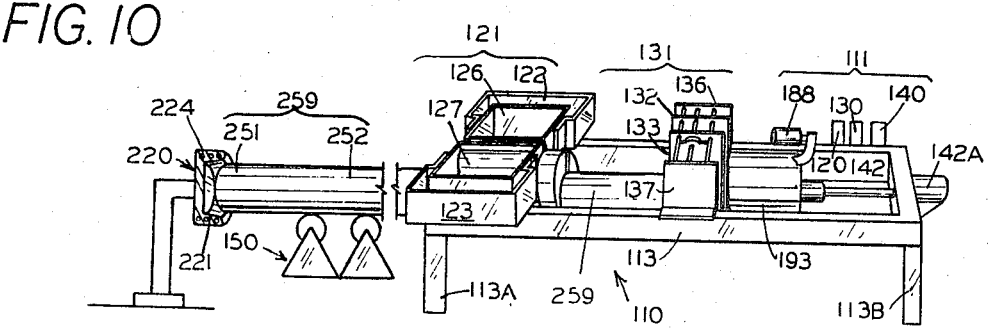
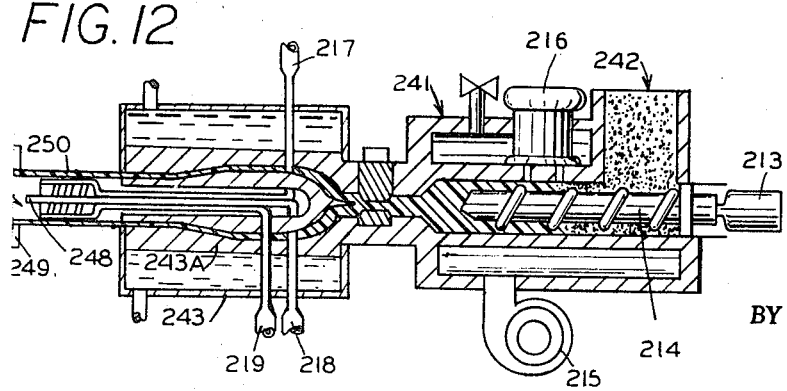
W. J. OGLE
H. B. LINDLY
AND
J. B. JOHNSON, JR.
INVENTORS
BY
Ely Silverman
ATTORNEY

IRRIGATION PIPE SYSTEM AND PIPE UNITS THEREFOR

BACKGROUND OF THE INVENTION

1. Fields of Invention a. Pipe joints wherein the free ends of the members to be joined are so constructed that the particular interfaces cooperate to produce an unexpected result, involving an annular cavity recess means on one member for the reception of an annular male member on the other member;

b. machine and implements for expanding or flanging tubes by means of a gradually expanding die; and c. process and apparatus for extruding plastic pipe.

2. Description of the Prior Art

The growth of large scale irrigation in agriculture has been a dramatic development of the past 10 years and the growth of use of plastic pipe has also been extensive within those years. Nevertheless the utilization of plastic pipes for irrigation and the formation and permanent maintenance of reliable joints in such pipe has been a continued problem. Field assembly of such units is undesirable and unsatisfactory technically and economically especially in view of the present shortage of manual labor for such tasks. A pipe and joint assembly is hereby made that is rapidly and reliably handled, and assembled by providing for a pipe and its joint assembly in one principal piece which piece forms and maintains in the present conventional large scale irrigation systems a thoroughly reliable seal.

SUMMARY OF THE INVENTION

Spigot and bell portion of a one piece relatively rigid pipe unit are formed with walls progressively thickened towards their ends. The spigot thickening provides elastic yet increased resistance to separation of a bell therefrom as strain thereacross increases; the bell portion is formed with a thickened and asymmetric gasket seal that provides a shoulder to lodge a gasket against an elastically deformed portion of plastic pipe to resist separation of the spigot and bell elements.

One object of this invention is to provide an irrigation pipe system that is reliably and rapidly installed with joints that reliably remain watertight.

A second object of this invention is to provide a reliable pipe and joint assembly unit, each joint of which readily forms a watertight seal with a like adjoining piece of pipe in a series of such pipe yet permits fast installation and thoroughly reliable seal.

Another object of this invention is to provide an apparatus for the ready formation of such pipe and joint assembly units.

Yet another object of this invention is to provide a process of operation of the apparatus for production of such pipe and joint assembly units.

BRIEF DESCRIPTION OF THE DRAWINGS

FIG. 1 is a diagrammatic longitudinal sectional view through a pipe unit 21 and adjoining portions of like units 41 and 61 in an operative position thereof.

FIG. 2 is a diagrammatic longitudinal sectional view of the same units shown in FIG. 1 when there has been a longitudinal strain placed on that assembly and a concomitant longitudinal displacement of parts thereof, which displacement relationships are shown in this FIG.

FIG. 6 is an enlarged and partially broken away perspective view of the bell-forming assembly 110 of this invention in an early stage of the bell-forming operation.

FIG. 7 a diagrammatic diametral longitudinal sectional view of the extrudate 250 produced by the extruder line assembly 240 which extrudate is treated in the bell-forming apparatus 110 to form the units as 21, 41 and 61 shown in the FIGS. 1, 2 and 4.

FIG. 8 is a view of the front face of the recess-forming plate 163.

FIG. 9 is a plan view of the rear, grooved, face 175 of the flare plate 170.

FIG. 10 is a diagrammatic perspective view of the bell-forming assembly 110 in a position of the parts thereof when the recess 25 is being formed in the pipe portion 259 held by the apparatus 110 and showing spigot forming mandrel 220.

FIG. 11 is a vertical longitudinal sectional view in zone 11A of FIG. 10 during the stage of operation thereof shown in FIG. 10.

FIG. 12 is an enlarged vertical diametral sectional view of the portion of the apparatus 240 shown in zone 12A of FIG. 3.

Figure 5:
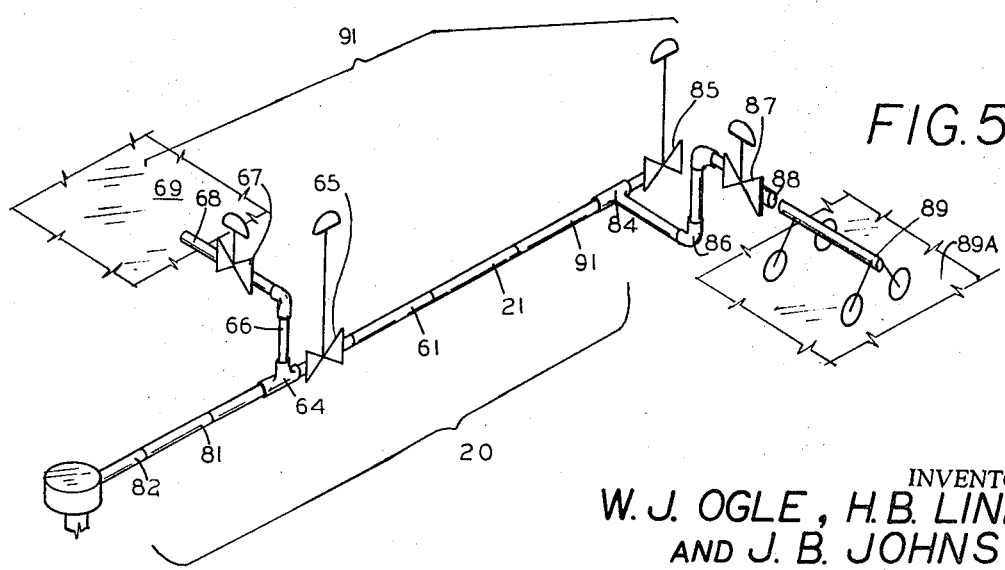
FIG. 5 is a diagrammatic perspective view of an irrigation system, 91, using the pipe units of this invention.

Table I gives physical and other engineering properties of the material of which the pipe units as 21 in FIGS. 1 and 5 are formed.

Figure 4:
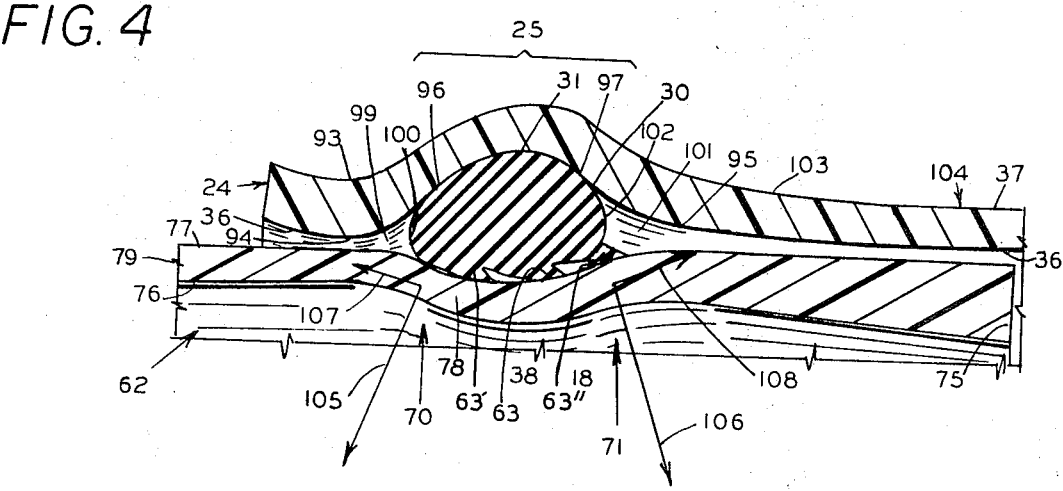
FIG. 4 is an enlarged diagrammatic view of zone 4A of FIG. 1.

Table II gives dimensions of pipe unit as 21 with reference to locations shown in FIGS. 1 and 4, in a representative embodiment of unit 21.

Figure 3:
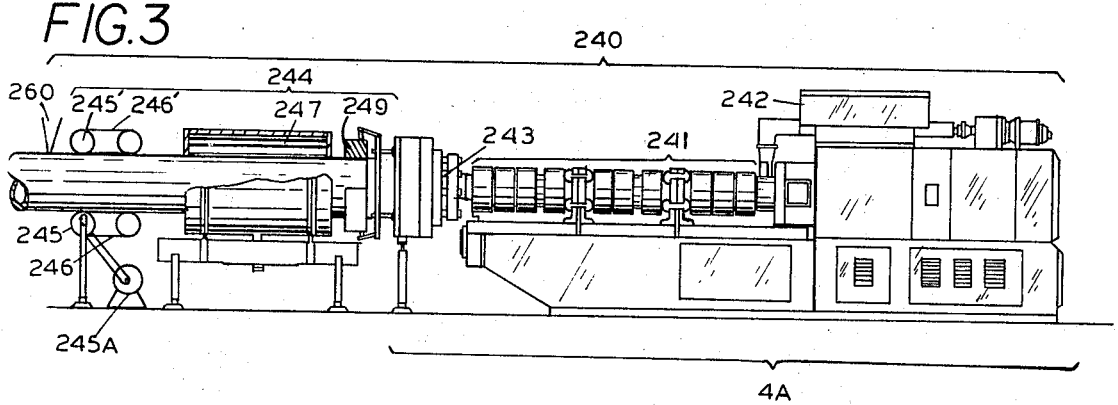
FIG. 3 is a diagrammatic representation of an extruder line assembly, apparatus 240, used to form the pipe units, as 21.

Table III is an exemplary formulation of material fed into the hopper 242 of apparatus shown in FIGS. 3 and 12.

DESCRIPTION OF THE PREFERRED EMBODIMENT

The product of this invention is a serially connected group 20, of plastic pipe units, which group comprises a series of like pipe units, as 21, 41 and 61. Such group of pipe units is used in an irrigation system as 91, that system comprising a plurality of like pipe units, 21, 41, 61, 81, 82 and 83, branched conduits as 64 and 84, main line valves as 65 and 85, branch lines as 66 and 86, branch line valves as 67 and 87 and branch discharge lines as 68 and 88 for discharge to field portions as 69 and 89.

Each of the like pipe units as 21 is composed of, in operative connection, a male or spigot end portion as 22, a female or bell end portion as 23, a middle portion as 32, and a gasket as 30 with spigot opening 35A and bell opening 24A.

The bell end portion 23 is firmly attached to and adjoins the middle portion 32 and the portion 32 is firmly attached to and adjoins spigot end portion 22. Gasket 30 provides a watertight junction between one unit as 21, of a series as units 21, 41 and 61 and a unit adjacent thereto as 61. Each pipe unit as 21 has a continuous smooth cylindrical interior surface 36 and a continuous smooth exterior surface 37. Measured transverse to the length of each unit as 21, the thickness of the pipe wall between surfaces as 36 and 37 is uniform circumferentially and the wall thickness is uniform all along the length of each middle portion as 32 but the thickness of the wall as 39 in portions as 22 and 23 is greater than the wall thickness for middle portions as 32.

The bell end portion 23 comprises a flared terminal end, 24, an annular gasket seating portion 25, an elongated cylindrical bell portion and a conical transition portion 27. The flared terminal edge 24 is conical in shape with the wider end open to the bell end of the pipe, the left end as shown in FIG. 1; immediately to the right, as shown in FIG. 1, of the narrow neck 93 of the flared bell end 24 is a radial enlargement, the gasket seat 25. The wall of seat 25 is of no less thickness than, but of greater diameter than, the remainder of the bell end assembly 23; its outer and inner surfaces are uniform in radius measured transverse to its length. Cylindrical bell portion 26 generally is cylindrical in shape and of less maximum outer diameter than the seating portion 25 and is joined to the larger end 28 of the transition portion 27. The conical transition portion 27 is generally conical in shape and coaxial with the portions 24, 25, 26, 32 and 22 of the unit 21. Transition portion 27 on its right end (as shown in FIG. 1) 29 joins the middle portion 32. Portion 32 is a hollow cylindrical pipe of uniform thickness, internal diameter and external diameter throughout.

The male or spigot end portion 22 which terminates at and there outlines spigot opening 35A has a thickened wall portion 34, which extends from the spigot end 35 of the unit 21 (right end as shown in FIG. 1) leftward to the gasket seat portion 45 of the corresponding bell portion 43 of the adjacent pipe unit 41, into which bell portion the portion 22 fits. The interior surface 36 of the bell portion 23 has an internal diameter slightly greater than the external diameter 37 of the spigot portion 22 of that pipe and sufficiently greater to form a smooth sliding fit with a corresponding spigot portion as 62.

The pipe unit 41 comprises a spigot end, not shown, a bell end portion 43 and a middle portion 52, which are identical in shape, size and structure to the similarly named portions 22, 23 and 32, respectively, of the unit 21. The pipe unit 61 comprises a spigot end portion 62; a bell end unit, not shown; and a middle portion 72 identical in size and shape and function to the portions 22, 23 and 32 of the unit 21. Pipe unit 41 has a continuous smooth cylindrical interior wall 76 and a continuous smooth exterior wall 77 with the imperforate pipe unit wall 79 therebetween. Pipe unit 41 has a continuous smooth interior surface wall 56 and a continuous smooth exterior surface 57 with imperforate pipe unit wall 59 therebetween.

A gasket 50 provides a watertight junction between the unit 41 and the adjacent unit 21. The elements indicated by reference numerals 44, 45, 46, 47, 48 and 49 of the assembly 43 are identical to the corresponding elements indicated by reference numerals 24, 25, 26, 27, 28 and 29, respectively, in unit 21 above described.

The bell portions 23 and 43 of like units 21 and 41 respectively and the spigot portions 22 and 62 of each of the like units 21 and 61 respectively have thicker walls than do the middle portions 32, 52 and 72 of such units 21, 41 and 61 respectively.

An annular flexible gasket, as 30, is located and closely fits within each gasket seating portion, as 25, of each unit, as 21. It is firmly located in place, as shown in FIG. 4, and smoothly contacts inner surface 31 of portion 25 and forms a watertight seal therewith, further described in detail herebelow.

The inner surface 63 of the gasket 32 is serrated with conical teeth 63', 63'', 63''' which forcefully contact the outer surface of the adjacent spigot portion 62 of the pipe unit 61. The gasket 30 is, to a degree, compressible, i.e. yieldable and spongy; it is initially softer than the surface walls 36 and 77. The gasket 30 nevertheless does develop an increasing hardness as it is compressed; such hardness and compression creates a slight yet definite elastic reduction of internal diameter and external diameter of the portion, 38, of the pipe spigot portion, as 62, contacted by the inner gasket surface 63; the surfaces 76 and 77 are smoothly and equally dished inwardly to the center of unit 61 in this indented portion 38 of the pipe spigot portion 62, of the unit (as 61), adjacent thereto. The outer end portion, 18, of the unit 61 to the outer side (right as shown in FIGS. 1 and 4) of the indented portion 38 and extending to the spigot end as 75 of the unit 61, is thicker than the more inward portion 78 of the wall 79 of the unit 61 immediately inward (to the left as shown in FIGS. 1 and 4) of the gasket 30 and indentation 38. Accordingly, each gasket as 30 in each gasket seat as 25 of one pipe unit, in combination with the peripheral thickening of the spigot portion of the adjacent pipe unit and the development of a deformation 38 in each such spigot portion, resists the motion of each such spigot end as 62 from each such bell portion as 23 in a direction (to the left as shown in FIG. 1) which would release the connection of the spigot end, as 62 of the unit 61, from that bell end portion, as 23 of the unit 21.

The same relations which are above described for bell portion 23 of unit 21 and spigot portion 62 of unit 61 occur at the bell end portion 43 of unit 41 relative to the spigot end 22 of the unit 21. At that zone the bell components 44—49, gasket 50 and spigot portions 33—35 and portions thereof have the same relations as above discussed for bell components 24-—29, gasket 30 and spigot portions 73—75 and portions thereof respectively. The relationships at the other pipe units as 81, 82, joined by like bell and spigot assemblies in the system 91 by the spigot portions as 62 and 22 and adjacent bell units as 23 and 43 respectively are the same as above described for units 21, 41 and 61.

As shown in FIG. 4 the radial force 71 due to the compression of the thick portion of the spigot wall 18 is greater than the radial force 70 at the thin spigot wall portion 78. The wall thickness of each pipe unit spigot portion as 62 and 22 and corresponding spigot portions of each of the units of the assembly 20 and in the system 91 increase in thickness from the inward portion (leftward portion as shown in FIGS. 1 and 4) to the spigot outer edge, as 75 for unit 61 and 35 for unit 21; because of this spigot structure, the resistance to further separation increases as each pair of joint members as 22 and 43 are separated, as well as that the structure tends to return the joint members to their initial position relative to each other. Accordingly, because of this structure of each spigot portion and gasket, as initial additional stress is applied longitudinally along the length of any one joint assembly, as the assembly comprising adjacent portions 22 and 43, its members (22 and 43) may be pulled apart only a limited distance and thereafter (as shown in FIG. 2) the stress or additional strain of such increased stress is taken over by a different assembly, as 23 and 62. This relationship provides for an even distribution of longitudinal stresses and strains along the different elements of the pipe units in the system 91.

The bell portion 23 has a neck, 93, of lesser internal diameter 94 than does the outer (leftward as shown in FIGS. 1 and 4) and wider end of the oblique portion 95 of the generally cylindrical portion 26 of bell portion 23. Oblique portion 95 is a slightly tapered conical portion continuous with seat 25 on one side and with truly cylindrical wall 104 on the other and coaxial with both. Gasket 30, therefor, not only bears a compressive force against the outer surface 77 of the spigot portion 62 of unit 61 but also exerts a longitudinal or axial (and horizontal as shown in FIGS. 1 and 4) force on the indented portion 38 of the spigot 62 thereby urging that spigot portion into the bell portion 23. In part this longitudinal or axial force is due to that the bell structure provides that the outer end (left as shown in FIG. 4) face 96 of the seat 25 acts like a shoulder against which gasket 30, acting like a compressed spring, acts on the outer portion 18 of the indented portion 38 of the spigot portion, urging it (rightward as shown in FIG. 4) inward into the bell 23.

A flare space 99 is located between the outer seat face 96 and the outer surface 77 of the spigot and the outer left face 100 of the gasket 30; it is narrower (measured vertically as shown in FIG. 4) than a bell space 101 located between the outer surface 77 of the spigot, the inner surface of portion 95 wall, and the (right as shown in FIG. 4) inner face 102 of the gasket 30 because the oblique portion 95 of the cylindrical portion 26 of the bell 23 tapers gradually from the inner seat portion 97 to the truly cylindrical portion 104 of the cylindrical portion 26 of the bell portion 23 of the unit 21.

Because the neck 93 adjacent the outer portion of the gasket 30 has lesser internal diameter than the oblique portion 95 of the bell portion, the compressive force shown by arrow 105 exerted on the most leftward (as shown in FIG. 4) portion of portion 38 contacted thereby is in a more vertical (as shown in FIG. 4) direction than is the force shown by arrow 106 exerted on the most rightward (as shown in FIG. 4) portion of portion 38 contacted thereby; the inward horizontal component 108 (to the right as shown in FIG. 4) of force 106 is greater than the outward (leftward as shown in FIG. 4) component 107 of force exerted by force 105; this geometrical description due to shape of the bell 23 is supplementary to the above discussion of greater inward force on the spigot 62 due to the stiffness of the spigot portion and the increasing thickness thereof toward the spigot end 75 from the middle portion of the pipe unit 61.

Dimensions of a typical unit 21 are provided in Table II, as quantitatively set out therein in a preferred embodiment of units 21, 41 and 61.

The neck 93 makes a tight fit on spigot 62 (e.g. 8.11 inches inner diameter at 94 against 8.15 inches outer diameter of pipe section 32 according to one embodiment) while cylindrical portion 26 of bell 23 makes a smooth sliding fit on spigot 62 (e.g. 8.18 inches inner diameter of bell portion 26 on 8.15 inches outer diameter of section 32). The spigot as 22 is narrowed at end 35 (e.g. to 7-15/16 inches) although thickened (to 0.210 inches in preferred embodiment) as above described to permit a force fit of each spigot end, as 62, in each bell as 23; a very slight smooth coating of lubricant, e.g. a silicone spray such as Dow Corning *210 fluid (it is a dimethyl silicone, properties in Dow Corning Bulletin 05-153 dated July 1966, trademark of Dow Corning Corporation, Midland, Mich. 48640) is applied to the outer surface of each spigot, as 62, to facilitate the entry thereof into the bell therefor whereby to permit movement of these elements relative to each other for such entry as well as passage of the spigot past the gasket therefor, as 30. The location of the spigot, as 62, in the bell, as 23, is affected slowly yet forcefully enough to deform the gasket and bell sufficiently to locate the spigot and bell and gasket as above described.

In laying pipe as in the group 20 the spigot end of each member in the series, as 61, and the bell of the next member, as are assembled and the assembly is then laid in a ditch therefor. Subsequently the group or string is covered by earth. However, not only does the earth later shift and temperature stresses develop in the pipe because of the difference between the temperature of the irrigation water and the ground temperature, but, more seriously, as shown in FIG. 5, the various valves along the length of the pipe are opened and closed at various times. When the valve 65 is closed in the series 20 there is a water hammer effect and an extension stress along the length of pipe elements as 82 and 81 due to the resistance to flow along the length thereof opposed by the closure of the valve 65. The various branch lines as 66 that connect to a tee as 64 permit the water to flow from element 82 to 81, to tee 64, thence to line 66 and then through and out via line 67 and valve 68 to a field as 69. With valves 65 and 67 open and valve 85 closed in the string 20 there is a water hammer effect on, and extension of, the series of pipe elements as 61, 21 and 41 due to the resistance to flow along the length thereof opposed by the closure of the valve 85. The branch line 86 that connects to tee 84 permits water to flow from element 82 to 81, through tee 64, through units 61, 21, 41 and tee 84 and thence to line 86 and then through and out via discharge line 88 to an irrigating machine 89 which may be operating from the pressure developed from the irrigating water in a field as 89A. Such movement of the water causes a reaction against and bending of the pipe string. Subsequently, when valves 85 and 87 close there is a further water hammer effect urging the tee 84 somewhat to the left as shown in FIG. 5. Opening of the valve 65 and closure of the valve 85 causes some elongation and stress along the members 61, 21 and 41 which would tend to elongate that particular length of pipe units; stresses in the string or group of pipe concomitant on these movements are borne with a minimum concentration of strain along any one pipe unit because of the distribution of axial strain amongst the members of the group by its relatively yieldable joints. While such joints (as between portions 23, 62 and 50) are able to absorb axial motion as above described, when compression stresses of 400 p.s.i. and 500 p.s.i. are applied to a series of pipe units as 21, 41, 61 connected as above described the pipe bursts before any joint opens.

The procedure for the manufacturing of the bell and spigot comprises the step of continuous forming and extruding and stretching the pipe thus extruded at varied rates to form thickened wall portions therein at regular intervals, cutting the pipe into sections of predetermined length, forming a bell portion in each of such length and forming the spigot portion on each of such pipe lengths and assembling such lengths in series.

The formulation of the plastic material which is extruded is one as in table III, that produces a relatively rigid yet tough pipe with physical properties as in table I.

The extruder line assembly 240 used to form the intermediate extrudate 250 from which the pipe units as 21, 31 and 41 are formed is composed of an extruder 241, a hopper 242, a mandrel and die assembly 243, a takeoff assembly 244, and a cutting assembly 260. Extruder 241 moves the feed formulation from a hopper, 242, into a conventional cooling and sizing mandrel and die 243. The pipe is not sufficiently cooled by the mandrel coolant to become so rigid that it may not be pulled away from the mandrel; the die determines the external diameter of the pipe; the takeoff speed, i.e. the linear speed of pulling the resin away from the die 243, as by takeoff wheels 245, and belts 246, (powered by a motor as 245A) of assembly 244 determines the wall thickness, a cooling bath 247 of assembly 244 forms the pipe for more ready control by wheels as 245 and 245' and belts as 246 and 246'. Extruder 241 is described in Bulletin E-8 of Prodex Fords, N.J. conventional motor 213, screw 214, air blower 215, vent 216, coolant input and output lines 217 and 219, and air line 218 are diagrammatically shown therefor.

The product of the extruder line assembly is a tubular extrudate 250, of uniform external diameter and provided with alternating intervals 252, 254 and 256 of small, uniform, wall thickness and internally thickened wall portions 251, 253, 255 and 257 of somewhat greater wall thickness each of the thickened portions as 251, 253, 255 and 257 have the same thickness. The tubular extrudate is cut through the longitudinal center of each of the thickened portions transversely to the length thereof (by blades 260A and 260B of assembly 260) as 251 and 253, each thus cut portion 259 is formed into a pipe unit as 21, as shown in FIG. 6, by processing as in the bell forming assembly 110, below described.

The final dimensions of the extrudate 250 are determined by external sizing dies or sleeves 249 by internal air pressure as it passes through a cooling bath 247 or trough of assembly 244; the air pressure is maintained inside the pipe by a series of bleeder type baffles of diameter almost equal to the internal diameter of the pipe and mounted in a hollow support pin extending beyond the die orifice inside the extruded pipe. Air is introduced through the hollow support pin 248 at a pressure sufficient to keep the internal pressure within the pipe at the desired level to contact the external sizing die without sticking thereto or harming the smooth surface of the extruded pipe.

The mix of the formulations of table I is forced through die 243, around a heated mandrel, 243A and drawn into a pipe form at the rate of from 4 to 6 feet per minute. The tubing is drawn from the extruder at a programmed rate of 6 feet per minute for a 32 foot 5 inch pipe length and then at the rate of 4½ feet per minute for the next 1½ feet of pipe so that a 34 feet 1 inch length unit as 259 above described, the thickness of the pipe is uniform, e.g. 0.160 inch thickness for 32 feet 5 inches and is gradually thickened up to 25 percent, i.e. to a maximum of 0.200 inches in the middle of each such 18 inch length portion. This procedure forms a pipe wall of regularly varied thickness; the thickness varies uniformly from the point of usual minimal wall thickness to the short zone of maximum wall thickness (over that 18 inch wall portion), i.e. the thickness of the pipe uniformly increases for a length of 9 inches and then, over the next 9 inches, uniformly decreases in thickness. These increases and decreases are at a uniform rate. These zones of increased thickness are formed at regular intervals equal to the pipe unit (as 21) length, the pipe so formed is cut through the middle of the thickened zone, these thickened portions form the spigot and bell end of each pipe unit as 21.

The bell forming assembly, 110 comprises a fixed rigid hollow base frame, 113 a rear clamp assembly, 121 a middle clamp assembly, 131 recess and flare assembly, 191 a movable mandrel assembly, 141 and a bell-former control assembly 111, operatively combined.

The assemblies 121, 131 and 141 are in part fixed to the base frame 113 and have parts that are movable with respect thereto and are adapted to hold and release and form the portion of the pipe from which the bell portion is formed. The pipe support frame 150 is spaced away from the frame 113 and slidably supports the middle portion of portion 250 while a bell portion is being formed at one end thereof.

The base frame assembly 113 comprises a rigid longitudinal left side member 114 and a rigid longitudinally extending right side member 115, a rigid transverse rear end member 116 and a transverse front end member 117. These members 113, 114, 115, 116, 117 are firmly joined at their ends to form a rigid centrally open base frame firmly located on a building floor by legs as 113A and 113B. The rear clamp and bracket assembly 121 comprises a rigid U-shaped left clamp bracket 122 and a rigid U-shaped right clamp bracket 123 each of which is firmly supported on the base frame 113. The left and right bracket each slidably and movably support within its arms a movable clamp jaw as 126 and 127 respectively; each jaw 126 and 127 has a concave face that is, respectively, provided with a replaceable bushing or liner 124 and 125 of semicylindrical internal outline that exactly matches the external outline of the cut portion 259 of extrudate 250 used to form a pipe unit as 21 and forms a firm fit therewith, with the matching, mirror image, left bushing 124 and right bushing 125 opposingly located; the support of each bracket as 122 for its jaw as 126 provides that the jaw 126 is movable transversely to the length of the frame 113 within its bracket 122.

Accordingly the clamp jaws 126 and 127 with their bushings 124 and 125 are movable within their brackets 122 and 123 respectively to firmly locate the portion 259 used to form a unit as 21 therein.

A hydraulic piston 129 is attached at one end thereof to the frame 113 and its other to the clamp jaw portion 125. A hydraulic conduit element 128A connects the piston 129 to close the clamps about an extrudate element as 259 and the conduit element 128B serves to connect the piston to release the clamp jaws.

The central bracket and clamp assembly 131 comprises movable rigid left and right clamp elements 132 and 133 respectively, left and right bushing or liner units 134 and 135 respectively located within each clamp 132 and 133 and each clamp 132 and 133 is movable transversely of the frame 113 while supported from rigid brackets 136 and 137 located on frame 113 on clamp support rods 136A and 137A between those brackets. A hydraulic piston 139 is connected to the frame 113 and to the clamp element 133 to force that clamp towards or away from the clamp 132. Conduit element 138A connects the piston 139 to close the clamps 132 and 133 on each other and conduit element 138B connects the piston to open the clamps 132 and 133.

Each bush unit as 134 is composed of a long concave cylindrical liner element 134A and a short concave cylindrical liner element 134B with an annular space 134C therebetween. The bush elements are firmly supported on the clamp element therefor. The space 134C serves to accommodate a gasket recess as 25 in the future bell 31. The liner elements 134A and 134C contact the expanded bell portion 104 and neck 93. Like elements are in unit 135.

The mandrel assembly 141 comprises a shaft 142, a shaped mandrel 143, a recess and flare assembly 191 and a driving and control mechanism 140 therefor, all operatively connected.

The mandrel 143 has a rear narrow cylindrical portion 144 and, adjacent thereto and continuous therewith a transition portion 145; the transition portion is smoothly continuous with the front larger cylindrical mandrel portion 147. The end portion 148 of the shaft 142 is threaded and that threaded portion is firmly attached to a matching threaded portion 149 in the end portion 146 of the narrow mandrel portion 144. The mandrel is hollow and its walls enclose a cavity 152. This cavity is closed at its front end by an end plate 151 and at its rear by the end 146 of the mandrel 143. The shaft 142 extends through a central hole in the plate 151 and provides for the support of the mandrel 143. A heating coil 154 is firmly attached in the wall of the mandrel and extends evenly therethrough, an input and output contact therefor connect to an electrical heating source. A thermostat within the cavity 152 provides for disconnection of the thermal heating circuit as necessary to maintain a pre-determined maximum temperature in the mandrel surface, usually 280°F., for the tube portion as 259 of composition as shown in table III.

A slightly tapered hollow mandrel 220 with heating coils 224 thereon and with an internal conical surface 221 is firmly supported as shown in FIG. 10 in coaxial line with the tubular portion 259 of the extrudate 250 and shaft 142 of assembly 110. Conical surface 221 has a taper of one-fourth inch in 2 inch length and a terminal taper of one-eighth inch in 1 inch, to a maximum internal diameter at its innermost portion one-eighth inch less than the outside diameter of the wall portion 32. Each extrudate portion as 259 may be gradually inserted into mandrel 220 while longitudinally movable on frame 150 to form a slightly tapered spigot end for each unit as 21.

The recess and flare assembly 191 comprises a recess forming plate 163, flare plate 170, and wedge plate assembly 180 in a cooperative combination and cooperates with the mandrel assembly to provide the flare portion 24 as well as characteristics of the shape of the gasket seating recess 25 of each pipe unit as 21; details are shown in FIGS. 6, 8, 9 and 11.

The recess forming plate 163 is, generally, a mushroom-shaped structure, it has a wide rear disc-shaped portion 168 and, coaxial therewith, a narrower cylindrical front cylindrical portion 167; both portions are rigid steel, and firmly attached to each other. Portion 168 has a circular peripheral edge 164 that is smoothly rounded as seen in axial or longitudinal transverse section (as FIG. 11); it has a flat rear face 166. A diametrically extending slot 161 has rounded top and bottom (as seen in FIG. 8) ends 161A and 161B and straight flat sides and extends from the front face 165 of plate 163 to the rear face 166 thereof. The width of the slot 161, (as measured from one side to the other) is the same as the width of shaft 142; the central axes of those rounded ends are parallel to each other and to the sides of the slot and perpendicular to the rear face 166. The radius of the rounded top and bottom edges of the slot is the same as the radius of the shaft 142. The outer, major, radius of edge 164 is the same as the radius of mandrel portion 147. The outer radius of portion 167 is smaller than the outer radius of portion 168 and does not extend as far radially as mandrel portion 147 even in the most eccentric position of plate 163 relative to shaft 142 as shown in FIG. 11.

Face 165 has two deep straight guide recesses 162A and 162B that extend parallel to the center of slot 161 and to each other. The bottom end 161B of slot 161 has a hole 161C for location of a spring 161D. Spring 161D is compressed against shaft 142 and urges the top edge 161A toward the shaft 142; the center axis of rounded top edge 161A is coaxial with the longitudinal or axial center of plate 163. A straight flat rearwardly and downwardly angled face 159 at center of edge 161A is contacted by a matching sloped face 189 of a wedge 181 that is located parallel to shaft 142 and adjacent thereto and is provided with cooperating structures whereby to be moved forward and rearward while oriented axially of shaft 142 to effect central and radial motion of plate 163.

The flare plate 170 is, generally, a flat rigid plate of circular outline. Its rear face 175 is flat and provided with a series of concentric grooves 171, 172, 173 and 174 of particular shape, and its front face 176 is flat and parallel to face 175.

A hollow cylindrical bushing 178 is located firmly at the center of plate 170 and surrounds a cylindrical space 179; the internal diameter of bushing 178 forms a smooth rotatable fit on shaft 142 which correspondingly fits in space 179; shaft 142, bushing 178, and plate 170 and grooves 171, 172, 173 and 174 are coaxial. A wedge plate locator slot, 177 rectangular in axial (as in FIG. 11) rectangular in transverse (as seen in FIG. 9) section, is located immediately peripheral to bushing 178 and passes through plate 170; the wedge plate 181 forms a smooth slidable fit therethrough as is shown in FIG. 11.

Right side guide lug 169A and left side guide lug 169B extend rearwardly from the front face 175 of plate 170. These lugs are rigid and straight and located on either side of hole 179 and diametrically opposite to each other. Guide lugs 169A and 169B fit into guide slots 162A and 162B of plate 167, respectively, with a smooth slidable fit and, with face 165 of plate 163 adjacent face 175 of plate 170 in the operative position of these elements, as shown in FIGS. 6, 9 and 11 and with slot 177 in line with the center of face 159 at center of edge 161A, keep plate 163 in fixed angular relationship to plate 170 yet permits plate 163 to be moved radially by wedge plate 181 on shaft 142 to a lesser than, greater than, or the same peripheral radius as mandrel portion 147.

Each groove 171, 172, 173, and 174 has a conical surface as 173A for groove 173 and, lateral thereto, a cylindrical face as 173B parallel to axis of shaft 142, joined by a toroidal groove portion 173C. Each of the surfaces as 173A is the surface of a right cone and is parallel to the corresponding surfaces in the other grooves, thus the angle made by the surface as 173A with the axis of the shaft 142 is the same for the conical surface of each groove on face 175.

Wedge plate assembly 180 comprises a wedge plate 181 and a control apparatus therefor 188. Wedge plate 181 is a rigid bar provided with a narrow straight middle rigid portion 182 rectangular in longitudinal and transverse outline and a rear triangular shaped portion 183 having a face 189 which is sloped upward and forward relative to the axis of the shaft 142 and flat smooth contact portion 185 which maintains smooth, axially slidable contact with surface on shaft 142. The slot in edge 161A of plate 163 has a face 159 with a slope corresponding exactly to that of the face 189 whereby axial movement of the plate 181 causes a corresponding predetermined radial motion of the plate 163. Portion 182 of the wedge plate 181 fits slidably into the slot 177 of the plate 170; a spring 187 is resiliently compressed between the front of plate 170 at one end and is firmly fixed against a shoulder 186 therefor at the front end of portion 182 of the wedge plate 181.

A housing 193 is supported on shaft 142 for axial movement therewith, a drive gear wheel 194 is mounted in a shaft 205. Shaft 195 is parallel to and spaced away from shaft 142 and rotatably mounted in housing 193 and driven by gear wheel 195. A geared wheel 192 coaxial with plate 170 is fixed to the front face thereof. Drive gear wheel 194 engages and rotates wheel 192 and, when plate 181 is moved rearwardly to engage it, plate 163.

A piston housing 196 is mounted firmly on housing 193 on bracket 200 and moves therewith. A piston 197 therein operates through pivotally connected rigid link arms 198 and 199 to move wedge plate 181 forward and rearward relative to plate 163.

Control apparatus 188 comprises a hydraulic control valve 160, a high pressure hydraulic liquid source 118 and a low-pressure hydraulic liquid container 119, all operatively connected.

The control assembly 111 comprises a high-pressure hydraulic fluid power source 118 and hydraulic fluid container 119 and control valves 120, 130, 140 and 160 for assemblies 121, 131, 141 and 188 respectively. The hydraulic fluid is a liquid. Each of the conventional manual control valves 120, 130, 140 and 160 is operatively connected to a source of high-pressure hydraulic fluid 118 and to a hydraulic fluid reservoir 119.

Valve 120 is also operatively connected by conventional hydraulic lines 128A and 128B to hydraulic piston assembly 129A. In one position of the control handle of valve 120 the piston 129A of the assembly 129 is expanded; in another position of the valve control arm that piston 129 is contracted; thereby valve 120 serves to close and open elements 124 and 125 on the tubing portion as 252 located therebetween.

Valve 130 is operatively connected as by conventional hydraulic lines 138A and 138B to hydraulic piston assembly 139A. In one position of control handle thereof valve 130, piston 139 of that assembly is expanded; in another position of the control valve that piston 139 is contracted, thereby valve 130 serves to close and open bush elements 135 and 134 on the tubing portion as 253 located therebetween.

Valve 140 is operatively connected by conventional hydraulic lines 140A and 140B to a piston cylinder 142A firmly supported on frame 113. The piston cylinder 142A supports and locates shaft 142. In one position of control valve 140 piston shaft 142 is moved out of and extends further (to the left as shown in FIG. 10) from cylinder 142A; in another position of the control arm valve 140 the shaft is moved into the cylinder 142A and thereby contracted (to the right as shown in FIG. 6); thereby valve 140 serves to move the shaft 142 and housing 193 and piston cylinder 196 thereon and mandrel assembly 141 towards (as shown in FIG. 10) and away from (as shown in FIG. 6) bracket assembly 131.

Control valve 160 is operatively connected by conventional hydraulic lines 160A and 160B to a conventional hydraulic piston cylinder 196 of control assembly apparatus 188; cylinder 196 is firmly attached to housing 193 by a rigid bracket 200. A hydraulic piston 197 located in the cylinder 196 is pivotally connected by a horizontal pivot pin to a vertically extending link arm 198 that is pivotally supported on a horizontally extending pin on bracket 200 and pivotally connected by a horizontal pivot pin to a rigid horizontally extending link arm 199. A ring 181A is longitudinally slidable on shaft 142 and its rear flat face slidable contacts the front face of shoulder 186 on wedge plate 181 and its front (right as shown in FIG. 10) edge is pivotally attached to an end (left as shown in FIGS. 6 and 10) of arm 199. Spring 187 resiliently urges shoulder 186 of plate 181 in one direction (right as shown in FIG. 110).

An adjustable bleeder valve 212 in the line 160B provides for varying and automatically controlled slow return of hydraulic fluid from cylinder 196 to reservoir 119 and, by a corresponding slow motion (rightward as shown in FIG. 6) of piston 197 and a correspondingly gradual motion of wedge plate 181 (leftward as shown in FIG. 10) through a ring as 181A, longitudinally slidable on shaft 142, to cause face 189 of plate 181 to contact face 159 of plate 163 and thereby very slowly increase the effective radius of edge 164 of plate 163 relative to the center of shaft 142.

In operation of the apparatus, rear bracket and clamp assembly 121 and central bracket and clamp assembly 131 are opened and the mandrel assembly 141 is moved to the retracted position (right as shown in FIG. 6). An element of pipe, 259 is then located in the assembly 121 with its future bell end located at the right side of the assembly 131 and its spigot end located beyond the rollable support 150. The bushes 124, 125, 134 and 135 are chosen and located in the assembly 110 so that the axis of the shaft 142 is coaxial with the center of the to be formed pipe element as 21 with interior faces at 124 and 125 having the outside diameter of the portion 31 and the bushes 135 and 134 conforming to the outside diameter of the cylindrical portion 104 of the bell portion 22 of the pipe element 21.

After the location of the pipe in the assembly 120, clamps 122 and 123 are driven closed by the piston 129, and the clamps 132 and 133 are driven closed by the piston 139 and the walls of the mandrel assembly 141 are heated so that the peripheral temperature thereof is 280°F., which temperature is high enough to readily form the material of which each pipe portion as 259 is composed yet not so hot as to cause decomposition thereof. After thus heated, the control assembly 140 for the mandrel assembly 141 advances the narrower portion 144 of the mandrel into the portion of the pipe then held within the central assembly 131. Portion 144 is substantially, i.e. about one-half inch lesser internal diameter than the internal diameter of the tube 259 then held by the assembly 131. The transition portion 145, on inward (leftward as shown in FIG. 6) movement, expands the end of the tube 259. The mandrel assembly is moved into the tube at a slow but continuous rate, i.e. about 9 inches per 12 seconds. After the portion 147 of the mandrel has been entered into and has formed the true cylindrical portion 104 of the bell portion 22 the mandrel continues onward into the tube (left as shown in FIG. 6) to form a continued expanded length corresponding to the intended future length, such length being measured axially of the tube, for the recess portion 25 and the flare portion 24 of the future tube 21. While the tubing wall is still warm because of its contact with the mandrel the gear plate 192 is driven to rotate about the shaft 142 and the piston 197 slowly and evenly moves the wedge plate 181 against face 159. The plate 163, together with the plate 170, then rotate about shaft 142, plate 163 rotates with an increasing amount of eccentricity as the plate face 189 moves against the correspondingly sloped face 159 at edge 161A of plate 163 and moves plate 163 radially.

This motion of the plate 163 forms an enlargement in the top portion of the bell wall 37 that is contacted thereby: however, the nature of eccentrically moving plate 163 is that, while it is expanding one, upper, portion of tube 259 (as shown in FIG. 11) it is exerting no force whatever on the opposite, bottom end, of the tube. Accordingly, that free portion of the tube, which is then firmly held on the transition portion 145 of the mandrel assembly 141 is slightly drawn toward the future transition portion 29 of the tube 21 and an assymmetric cavity is formed with the rear (left as shown in FIG. 11) part of wall portion 25 of a distinct less radius of curvature than the more advanced portion thereof (right as in FIG. 11, left in FIG. 4). The action is accomplished without separate heating of the plate, the friction between the rotating plate and the stationary wall 37 of the tubing 21 provides sufficient heat to maintain that wall at a plastic condition. The heating provided by this friction also causes a thickening of the wall portion peripheral (left as in FIG. 4, right as in FIG. 11) to the gasket seat 25 as well as a shortening of the tubing due to the tensile force permitted across the gasket seat 25 by the removal of the edge 164 of plate 163 from the space between the edge 165 (left edge as shown in FIG. 11) and the plate 170 in the above described eccentric rotation of the plate 163. This thickening of the tube wall at the locus of the formation of the gasket seat 25 and peripheral to such locus (to the right as shown in FIG. 11, and left in FIG. 4) more than compensates for what would otherwise be a thinning of the wall 37 due to the increase in the surface thereof created by the action of the plate 163 in the creation of the radially extended seating portion 25 and supplements the increased thickness during the extrusion and cutting of the tube portions forming each pipe element such as 259 in that the wall portion 251 and 253 adjacent the future spigot end 22 and the future bell end 23 respectively both are formed of a tube which has a greater wall thickness at its ends 251 and 253 than at its center 252.

The particular exemplary plastic material described in table III, is illustrative, not limiting, of formulations that form into a pipe with engineering and physical properties as in table I, (such others are well known e.g. at Source Book of New Plastics, Simonds 1961, Vol. 2, Reinhold Pub. Co., table 2, page 165; page 84 of Modern Plastics, May 1965, table I, "Typical properties of plastic pipe materials"; and the state of the art also permits of varying properties using the same polymer with variations in the content and composition of plasticizer, e.g. "Formulating Plasticizer Blends by Master Charts", John McBroom, pages 145—146, Jan. 1966, Modern Plastics).

The 8 inch size of pipe above described is also illustrative and not limiting as 10 inches and 12 inches (as well as 6 inches and 4 inches) inner diameter pipe may be made by the process above described using apparatus (e.g. extrusion mandrel 243, mandrel assembly 143 and plate 163) directly proportionately sized and with the relationships above described for the particular size used. The correspondingly sized bushings 124, 125, 134 and 135 are located in jaws 126, 127, 136 and 137 respectively, and other mandrel shells than 143 and plates as 163 are put on shaft 142 in lieu of that above described for 8 inch pipe units as 21 and larger conical surfaces as 172, 173, 174 may be used rather than surface 171 as above described.

The internal diameter of bushings 124 and 125 mold the external diameter of the portion 32 as above described; the mandrel shell as 143 is chosen so that the narrow portion 146 thereof fits easily into the internal bore of the extrudate portion as 259 and the wider portion 147 of the mandrel determines the desired internal diameter of the cylindrical portion as 104 of the future bell as 23 as in the above-described procedure and apparatus. Also as in the above-described procedure and apparatus, the recess forming plate used as 163 is located on shaft 142 in the annular space 134C between cylindrical liner elements as 134A and 134B in the middle clamp unit when the short concave cylindrical elements as 134B and 135B are located adjacent the flare plate die face 175 and the short concave cylindrical liner elements as 134B and 135B are controllably moved to a position as shown in FIG. 11. In that arrangement of elements the short cylindrical liner element 134B is supported firmly relative to liner element 134A by a plurality of like rigid bridging elements as 134D therebetween and firmly attached to elements 134A and 134B. The inner diameter of element 134B is the same as the inner diameter of element 134A but element 134B is essentially an annulus or ring and, while three-fourth inches thick, is only one-half to three-fourth inch long and its inner surface is smooth and convex in the embodiment for forming the 8 inch pipe of table II.

The unit 135 is formed of units corresponding to those above described for unit 134 of which 135B and 135D are shown (in FIG. 6). As provided for in the above described embodiment of apparatus and process for the formation of the flared portion as 24 of each bell portion, the flare plate conical surfaces as 172A are each intersected by a projected cylindrical surface coaxial with and of the same size as the wider, front, cylindrical portion as 147 of the mandrel used therewith as shown in FIG. 11.

The spigot end 23 of the pipe 21 is formed by heating the end 251 of the cut portion 259 opposite to the end 253 at which the future bell is located as above described in a slightly tapered conical hollow mandrel 220 to provide a slight but definite narrowing (i.e. one-eighth inches outer diameter) of the thickened spigot end from the outside diameter of the center portion, as 32, of the unit as 21. This spigot end shaping facilitates the entry thereof into the bell end notwithstanding that the neck 94 has a

TABLE I

| Property | ASTM test | ASTM D 1764–60T requirement | Test result |
|---|---|---|---|
| Tensile strength, p.s.i. | D 638 | [1] 7,000 | 7,300 |
| Tensile modulus, p.s.i. | D 638 | [1] 400,000 | 407,000 |
| Flexural strength, p.s.i. | D 790 | [1] 11,000 | 13,000 |
| Izod Impact, Ft. lb./in. of notch: | | | |
| At 72° F | D 256 | [1] 0.65 | 1.50 |
| At 0° F | | | 0.80 |
| At 60° F | | | 0.80 |
| Deflection temperature, ° C. under 264 p.s.i. load | D 648 | [1] 70 | 78 |
| Dielectric constant, 60 c.p.s. | D 150 | | 3.71×10[6] |
| Flammability | D 635 | [2] S.E. | S.E. |
| Compressive strength, p.s.i. | D 695 | | 10,000 |
| Hardness: | | | |
| Rockwell "M" | D 785 | | 63 |
| Shore "D" | | | 80 |
| Chem. Resistance | D 543 | | |
| 93% H$_2$SO$_4$ 14 days Floating at 55° C.: | | | |
| Change in weight, percent (range) | | [3] +5.0, −0.1 | [3] −0.05 |
| Change in flexural strength, percent (range) | | +5.0, −25.0 | +4.9 |
| ASTM Oil No. 3, 30 day immersion at 23° C.: Change in weight, percent (range) | | ±1.0 | +0.001 |
| Distilled Water | D 570 | | |
| 24 hours at 23° C., Increase in weight (percent) | | | +0.01 |
| 24 hours at 100° C., Increase in weight (percent) | | | +0.50 |

[1] Minutes.
[2] S.E.=Self extinguishing.
[3] No sweating.

| Item measured | Figure | Location | Measurement, inches |
|---|---|---|---|

TABLE II.—UNIT 21 DIMENSIONS

| Item measured | Figure | Location | Measurement, inches |
|---|---|---|---|
| Overall dimensions: | | | |
| Flare end to minimum diameter | 4 | 24–94 | 7/8 |
| Across recess | 4 | 94–95 | 1¼ |
| Bell length | 1 | 24–29 | 9¾ |
| Length of 3 units (21, 41, 61) in assembly 91 | 5 | 65–84 | (¹) |
| Length of unit 21 | 1 | 24–35 | (²) |
| Outside diameters: | | | |
| Middle section | 1 | 32 | 8.16 |
| Cylindrical portion of bell | 4 | 104 | 8.51 |
| Gasket recess | 1 | 25 | 9.27 |
| Spigot end | 1 | 75 | 7.938 |
| Neck internal diameter | 4 | 94 | 8.11 |
| Flared end | 4 | 24 | 9.00 |
| Thickness of wall: | | | |
| Neck | 4 | 93 | 0.21 |
| Outer portion of seat | 4 | 96 | 0.21 |
| Wall, edge of 25 | 4 | 31 | 0.18 |
| Inside portion of seat | 4 | 97 | 0.18 |
| Oblique end of cylindrical portion | 4 | 95 | 0.17 |
| True cylindrical portion of bell | 1 | 104 | 0.165 |
| Spigot portion wall | 1 | 72 | 0.165 |
| Spigot end | 1 | 75 | 0.21 |
| Flared end | 4 | 24 | 0.19 |
| Initial internal depth of recess 25 (without gasket) | 4 | 31–77 | 0.31 |
| Diameter of matching circle on surface of seat 25, as viewed in longitudinal vertical diametral section: | | | |
| On internal surface of seat 25: | | | |
| Seat at maximum internal diameter | 4 | 31 | 7/8 |
| Bell space end | 4 | 102 | 1¾ |
| Flare space end | 4 | 100 | 1⅜ |
| On external surface of seat 25: | | | |
| Seat, at maximum external diameter | 4 | 31 | 1⅛ |
| Bell space end | 4 | 102 | 1 1/16 |
| Flare space end | 4 | 100 | 1 3/16 |
| Gasket 30: | | | |
| Original thickness (vertical in fig. 4) | 4 | 63–31 | 7/16 |
| Width, original | 4 | 100–102 | 3/4 |
| Diameter of circle matching outside curvature of gasket surface | 4 | | 3/4 |

¹ 100 feet.
² 34 feet 1 inch.

TABLE III.—COMPOSITION OF EXEMPLARY FORMULATION

| Material | Percent by weight |
|---|---|
| Polyvinyl chloride | 88–92 |
| Polyvinyl acetate | 1–2 |
| Plasticizer (di-octyl-phthalate) | 6–7 |
| Lubricant—lead stearate | 1–3 |

0003 slightly (0.000 to 0.010 inch) less diameter than the outside diameter of the wall as 37 at the center portion as 32, of each unit as 21.

The face 159 at upper edge 161A of slot 161 is bounded by flat vertical (as seen in FIG. 8) side walls and forms a triangular shaped straight sided recess 209; the sides of plate 181 are flat and form a smooth slidable fit with the sides of recess 209 as well as that the face 189 forms a smooth sliding contact with face 159.

We claim:
1. Irrigation pipe system comprising a plurality of like pipe units operatively connected in series, each pipe unit comprising a spigot end portion, a bell end portion and a middle portion therebetween, all integral with each other, a spigot end opening in the spigot end portion, a bell end opening in the bell end portion, the bell end portion comprising, in series, a terminal flared portion wider towards the bell end opening, a neck portion adjacent to said flared portion, an annular gasket seat portion adjacent to said neck portion, and a cylindrical portion adjacent to the gasket seat portion, a transition portion adjacent to the cylindrical portion and of conical shape, wider towards the bell opening, and said middle portion adjacent to the transition portion, the internal diameter of the neck portion being less than the internal diameter of the cylindrical portion of the bell portion, the inside diameter of the bell opening being greater than the outside diameter of the spigot end, a resilient compressed gasket ring seated in and contacting the gasket seat portion of each bell end and located between the said bell of one pipe unit and the spigot portion of the next pipe unit in series therewith and adjacent thereto and contacting said adjacent spigot portion and forming an elastic indentation in that adjacent spigot portion, each spigot portion being formed with a wall having a uniformly increasing thickness from the point at which it is indented to the spigot end opening, whereby an increase in longitudinal displacement of such spigot by withdrawal thereof from the bell into which it fits is opposed by an increasing axial force of said gasket against said spigot, and wherein the gasket seat has, as measured in a diametral plane passing through and parallel to the central longitudinal axis of the cylindrical portion of the bell portion, an internal convex curvature between the neck and gasket seat portion that has a radius of curvature that is less than the radius of curvature of the convex curvature between the gasket seat portion and the cylindrical portion of the bell portion of the pipe unit.

2. Apparatus as in claim 1 wherein the internal diameter of a portion of the bell portion of each pipe unit is less than the outer diameter of the middle portion of that pipe unit and the spigot end of one pipe unit forms a force fit into the neck of the bell portion of an adjacent pipe unit in series therewith and a loose sliding fit with the cylindrical portion of the bell portion of the said adjacent pipe unit in series therewith.

3. A plastic pipe unit comprising a spigot end portion, a bell end portion and a middle portion therebetween, all integral with each other, a spigot end opening in the spigot end portion, a bell end opening in the bell end portion, the inside diameter of the bell opening being greater than the outside diameter of the spigot end, the bell end portion comprising, in series, a terminal flared portion wider towards the bell end opening, a neck portion adjacent to said flared portion, an annular gasket seat portion adjacent to said neck portion, and a cylindrical portion adjacent to the gasket seat portion, a transition portion adjacent to the cylindrical portion and of conical shape, wider towards the bell opening, and said middle portion adjacent to the transition portion, the spigot terminal end portion formed with a wall of uniformly increasing thickness towards the spigot end opening, the internal diameter of the neck portion being less than the internal diameter of the cylindrical portion of the bell portion and wherein the gasket seat has, as measured in a diametral plane passing through and parallel to the central longitudinal axis of the cylindrical portion of the bell portion, an internal convex curvature between the neck and gasket seat portion that has a radius of curvature that is less than the radius of curvature of the convex curvature between the gasket seat portion and the cylindrical portion of the bell portion of the pipe unit.

4. Apparatus as in claim 3 wherein the internal diameter of the neck portion is less than the outer diameter of the said middle portion and in a series of such plastic pipe units the spigot end of one pipe unit forms a force fit into the neck of a bell portion of an adjacent like pipe unit and a loose sliding fit with the cylindrical portion of the bell portion of said like pipe unit in series therewith.